United States Patent [19]
Burch

[11] 3,746,865
[45] July 17, 1973

[54] THREADLINE DEFECT DETECTOR

[75] Inventor: James L. Burch, Tiverton, Ontario, Canada

[73] Assignee: Fiber Industries, Inc., Charlotte, N.C.

[22] Filed: July 6, 1971

[21] Appl. No.: 160,017

[52] U.S. Cl. ............... 250/219 S, 356/160, 250/206
[51] Int. Cl. ............................................. G01b 7/12
[58] Field of Search ............... 250/219 S, 206, 214; 356/159, 160, 238; 73/160, DIG. 11; 28/51

[56] References Cited
UNITED STATES PATENTS

| | | | |
|---|---|---|---|
| 3,584,225 | 6/1971 | Lindemann | 356/238 X |
| 3,044,345 | 7/1962 | Schottler | 250/219 S X |
| 3,543,360 | 12/1970 | Fertig | 250/219 S X |
| 3,309,754 | 3/1967 | Metcalf | 250/219 S X |
| 2,682,191 | 6/1954 | Anderson | 250/219 S X |

*Primary Examiner*—Walter Stolwein
*Attorney*—Thomas J. Morgan, Stephen D. Murphy et al.

[57] ABSTRACT

A detector for indicating the presence of partially broken, frizzed or knotted sections of threadlines, such as may occur during fiber forming operations, includes a housing, a lamp for directing light onto a rapidly moving threadline, a photoelectric cell for receiving such light and generating an electrical signal in response to it, guide means for snubbing the moving threadline and maintaining it in substantially constant positional relationship with the light, and an electronic signal amplification circuit in the housing, utilizing controlled capacitive buildup and decay of electronic signals responsive to those from the photoelectric cell, with the controlled buildup and decay being such that breaking of thread filaments, frizzing or knotting occuring over a length of from 2 to 50 times the width of the threadline actuates a counter, marker, cutter, visual or audio signal or other indicator or responsive device when the broken filaments are of a thickness from 1 to 30 percent of the threadline.

Other aspects of the invention include the mechanical structure of the detector, electronic circuitry and use of the device.

2 Claims, 7 Drawing Figures

Patented July 17, 1973  3,746,865

INVENTOR.
JAMES L. BURCH
BY Herbert M<u>c</u>Wean Jr

INVENTOR.
JAMES L. BURCH
BY Herbert M Adrian 3,746,865

THREADLINE DEFECT DETECTOR

SUBJECT OF THE INVENTION

This invention relates to an apparatus for detecting breaks, knots or frizzy loose threads or filaments in a rapidly moving threadline, such as one being spun, drawn or wound into a package. More particularly, it relates to a small self-contained photoelectric and amplifying apparatus for actuating an indicator or other device in response to the passage of broken, knotted or frizzed sections of a threadline past the detector. Also included within the invention are mechanical and electronic components of the detector and a method of detecting threadline defects utilizing such elements.

BACKGROUND OF THE INVENTION

In the manufacture of filaments, yarns, threads and fabrics from either natural or synthetic materials, it is often desirable continuously to inspect or monitor threadlines being manufactured or processed so that discontinuities, weaknesses, breaks, knots, frizziness or other irregularities therein may be detected. In cases where the discontinuities are serious enough, the weakened sections of the threadlines may be excised and the threadlines re-joined or the yarn package rejected. When the irregularities are not so serious as to require that they be cut out of the thread, following their development or monitoring their appearance may allow a machine operator to note spinning machines or positions producing defects and to take corrective action to minimize production of a weakened or unsatisfactory product. It is especially important to produce the strongest and most uniform threadline when the end product is one upon which human safety depends. For example, in the manufacture of tire cords, whether of glass, rayon, nylon, polyester or other such material, weaknesses in threads could ultimately lead to tire punctures or blowouts. Because the automatic production of filaments, threads and yarns today proceeds at very high speeds, the human eye is not quick enough and the human organism cannot respond fast enough satisfactorily to inspect or monitor threadlines for defects. Accordingly, mechanical and electronic means have been designed to accomplish this. Even mechanical devices are usually too slow to effectively indicate defects in very rapidly moving threadlines. For example, in a threadline moving at about 5,000 feet per minute having a defect extending over ¼ inch, a mechanical linkage would have to detect the presence of the defect in about 0.3 millisecond and would have to indicate it within about 0.1 second, at the most. Additionally, a mechanical detector would usually be responsive only to comparatively strongly held knots or complete breaks in a threadline because frizzed sections, which did not create a resistance for the mechanical device to bear against, would not be readily subject to detection. Of the electronic means employed, photoelectric cells and amplifiers have been used in combination to indicate, by a varying voltage generated, the degree of obstruction of a light beam by a threadline passing between it and the photoelectric cell. Such apparatuses have signaled the obstruction of the light beam by a galvanometer needle deflection on a calibrated dial or have been used to trace on a chart the voltage variations corresponding to threadline thicknesses. They have also been made to actuate signals, cutters or counters when the amplifier voltage or other electrical characteristic is above or below a particular level, characteristic of either unduly increased or decreased threadline thickness.

Commercially employed electronic threadline defect detectors have been comparatively complicated in construction, expensive and of greater size than desirable. They have often required rather complicated connnections to sources of electricity or the signaling mechanism. Once installed, such detectors have been difficult to remove or adjust for threads of different deniers. Also, they did not lend themselves to adjustment or repair in place in the plant, as do the devices of the present invention.

DESCRIPTION OF THE INVENTION

Unlike many prior art electronic devices, the present invention provides a compact, unitary, readily installable and removable threadline defect detector which is capable of locating and marking or otherwise indicating threadline defects not detectable by bigger, more expensive and more complicated systems. The invented article is particularly useful for detecting partial breaks, curls, frizzy filaments or knots in fast moving threadlines during spinning, drawing and/or rapid winding processes.

In accordance with the present invention there is provided a detector for indicating the presence of defects in a moving threadline which comprises a housing, means for emitting electromagnetic wave radiation, means for receiving radiation from the emitter and generating an electrical signal in response to the recieved radiation, wall means between said emitter and receiver, defining a passageway through which a threadline is passable so that it partially interrupts the radiation from the emitter to the receiver, guide means for maintaining the moving threadline in substantially constant positional relationship with the path of emitted radiation, an electronic signal amplification circuit within the housing, which circuit includes capacitive means for producing an amplified signal which is changed in response to partially broken and frizzed or knotted sections of threadlines in which the break of thread filament(s) and resulting frizzing or knotting occur over a length which is from about 2 to 50 times the width of the threadline and in which the broken filaments are of a thickness of from 1 to 30 percent that of the threadline, and means for actuating a counter, marker, cutter, visual or audio signal or other indicator or responsive device in response to the change in the amplified signal.

Also within the invention are more specific aspects of the described detector, including mechanical and electronic components thereof and methods for inspecting or monitoring individual lines by use of the mechanical and electronic structures and operations described herein.

Various objects, details, constructions, operations, uses and advantages of the invention, in its various aspects, will be apparent from the following description, taken in conjunction with the illustrative drawing of an embodiment thereof, in which drawing:

THE DRAWING

DETAILED DESCRIPTION OF THE INVENTION

Figure 1:
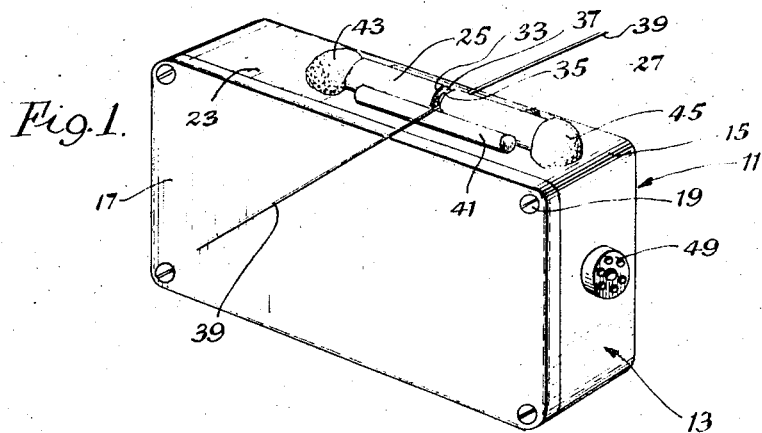
FIG. 1 is a perspective view of the detector in a normal operating position.
Figure 2:
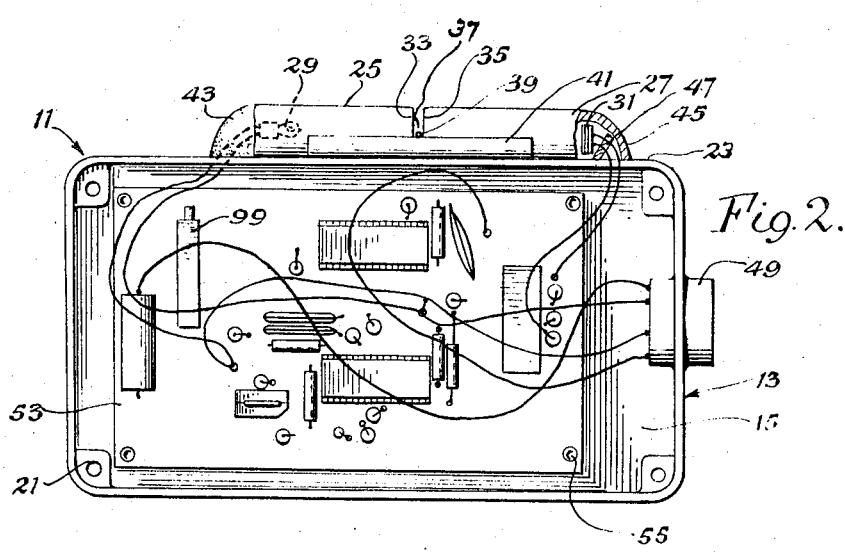
FIG. 2 is a front elevational view of the detector with the cover plate removed to show the positioning of the electronic elements on the contained printed circuit board.

In FIG. 1 there is shown "in operation" a yarn or threadline defect detector 11 having a housing 13 composed of a main body portion 15 and a cover plate 17. Cover plate 17 is held to body portion 15 by screws 19 which are screwed into internally threaded sections 21 of the housing body. Sections 21 are illustrated in FIG. 2. On the top side 23 of body portion 15 there are firmly fastened in place, as by cement, separate tubular shields, which are hollow ceramic cylinders 25 and 27, which house, respectively, an electromagnetic wave radiator, incandescent lamp or light emitting diode 29 and a high response silicon photoelectric cell 31. The ceramic cylinders are in axial alignment and their adjacent ends 33 and 35 act as walls defining a passageway 37 through which a fast moving yarn or threadline 39 passes for defect detection. The threadline is snubbed on the top surfaces of a pair of solid cylinders, arranged symmetrically about the hollow tubes 25 and 27. In FIG. 1 such solid "snubbing cylinder" 41 is illustrated. These cylinders are also cemented to the body of the housing and to the hollow cylinders and in combination therewith form a steady assembly, minimizing shaking of lamp and photoelectric cell parts and keeping the threadline in a relatively constant position with respect to the path of radiation from the lamp to the photoelectric cell. It will be seen that the tops of the solid cylinders are at about or somewhat below the mid-height of the internal passageways in the hollow cylinders. This allows the greatest width of photoelectric cell surface to be utilized for producing an electric signal responsive to the maximum length of threadline causing a "shadowing" effect. The "snubbing cylinders" provide a smooth round bearing or snubbing surface for the threadline. In some instances, this will tend to rotate the threadline so that any defects in it, such as frizzy sections, curls, knots, etc., will be rotated upwardly, into a particular section of the light path. Thus, instead of the thread passing through at about the mid-height of the light path, the heights of the solid cylinders, such as cylinder 41, may be lowered so that the defects, appearing above the threadline, will be in a more central portion of a light path. Although the threadline will not usually touch end walls 33 and 35, it is normally desirable that these also be rounded so that they contain no sharp edges which might tend to injure the threadline. From the preceding description it is seen that the solid cylinders or guide means 41 perform both thread guiding and detector element stabilizing functions in the present devices.

Shielding cylinders 25 and 27 are sealed off at their opposite ends by a suitable sealant, in the present case a black silicone rubber which also stabilizes the tubes in position on the detector housing. Silicone rubber cement deposits 43 and 45 extend sufficiently into the hollow cylinders 25 and 27 to hold in place the lamp 29 and photoelectric cell element 31, respectively. In holding the photoelectric cell in place, there may also be utilized a piece of an adhesive tape 47, to at least temporarily hold the cell element 31 in position across the end of the cylinder. Then, rubber cement or other suitable cement deposit 45 is placed over the tape and cylinder end and tightly holds the photoelectric cell element in fixed receiving position. Because the rubber cement is easily removed when such removal is desired, the lamp and photoelectric cell elements are easily replaceable, when burned out or when changes thereof are to be made, without the need for disturbing the amplifying electronic circuitry inside the housing.

Also illustrated on the exterior of the detector is a receptacle 49 through which power may be transmitted to the detector and an amplified signal may be sent out from it to a responsive device.

In FIG. 2 is shown an enlarged view of the threadline defect detector of FIG. 1 with cover plate 17 removed so that the electronic parts and their arrangement on a circuit board might be viewed. Potentiometer 99 is adjustable to facilitate varying the properties of the electronic circuit. Thus, the detector can be set for use with different yarns or threads and the sensitivity of the circuit can be changed so as to indicate particular types of snarls, frizzes, etc., while omitting to signal the presence of defects of lesser light-shadowing properties. As will be noted, a printed circuit board 53, having metal conductive paths on an insulating glass fiber reinforced polyester base, is mounted by insulating plastic pins 55 to the body portion 15 of detector housing 13. The various wiring connections to lamp 29, photoelectric cell 31 and receptacle means 49, for actuating a signal, indicator or responsive device, are shown. Details of the electronic circuitry are given in a description of FIG. 4, wherein this is better illustrated.

Figure 3:
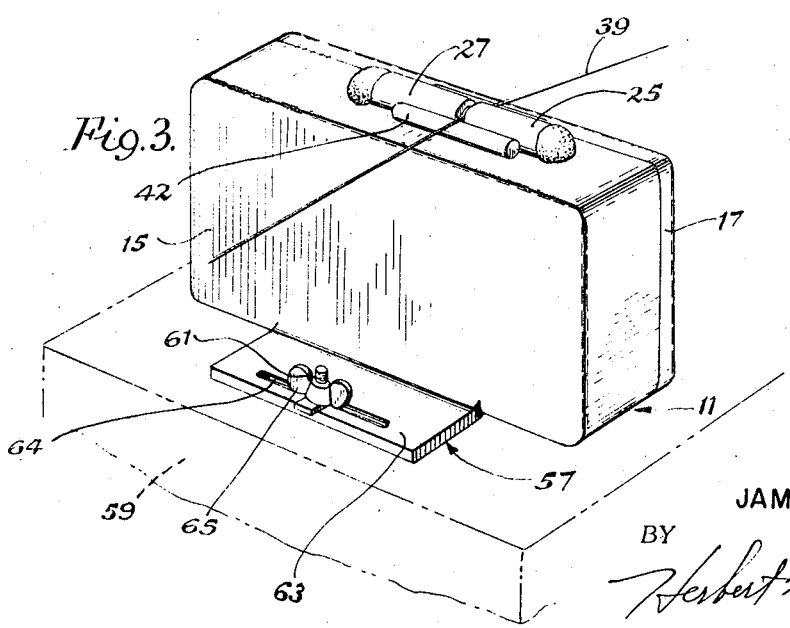
FIG. 3 is a rear perspective view of the detector, illustrating a greater degree of snubbing of the threadline as it passes through the detector opening and showing means for adjusting the detector in position on a machine part.

In FIG. 3 is shown the reverse side of the detector of FIGS. 1 and 2. As illustrated, means 57 is provided for fastening the detector housing to a suitable part 59 of a slubbing, winding, twisting, spinning or other suitable machine, so that the passage of the threadline 39 might be adjusted for best operation of the detector. As shown, the machine part has a stud 61 welded to it. Plate 63, welded or otherwise suitably fastened to housing portion 15 has an opening or slide 64 in it. A wing nut 65 may be tightened onto stud 61 to hold mounting plate 63 and detector 11 firmly in place so that the threadline passes over snubbing cylinders 41 and 42 and interrupts the light path from the lamp to the photoelectric cell in the most desired manner. Of course, instead of the simple adjustable fastening means illustrated, more complex scissors, brackets, fixable universal joints, slides, tracks, magnetic and adhesive devices may be employed, providing that sufficient degrees of adjustability and fixed positioning are attainable from their use.

Figure 4:
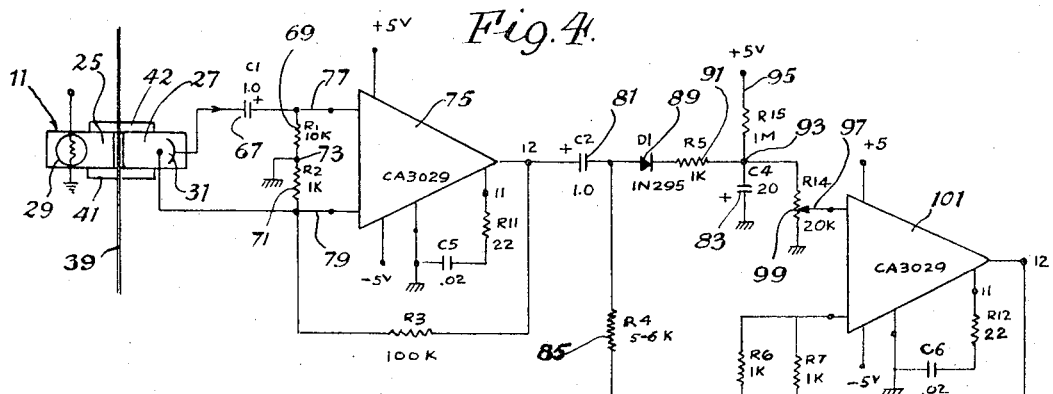
FIG. 4 is a diagram of the circuitry of the invention.

The electronic signal amplification circuit for producing an amplified signal in response to the voltage generated by the photoelectric cell and for making the amplified signal strong enough to be capable of actuating a counter, marker, cutter, visual or audio signal or other indicator or responsive device when an objectionable degree of breaking, frizzing, curling, snarling, knotting, fraying or other defect occurs on the rapidly moving threadline, is illustrated by the circuit diagram of FIG. 4. As is apparent from the drawing, the circuit is miniaturized and transistorized and is mounted on a printed circuit board so that it can fit inside the small housing provided, which makes the detector readily portable and installable in or on a wide variety of machines into which and through which threadlines may be passed. The size of the illustrated detector housing is about 11 cm. × 6 cm. × 2.5 cm. and usually the device will have a total volume of less than 500 cubic centimeters, preferably less than 200 c.cm.

Light source or lamp 29 directs light onto photoelectric cell 31 past a yarn or a threadline 39 which is in motion between the light source and the photocell. The output of the photocell is applied through capacitor 67 across a pair of resistors 69 and 71, which form a voltage divider chain connected at their common point 73 to ground and providing the input voltage to the amplifier 75 across the conductors 77 and 79. Capacitor 81 is of relatively small value with respect to capacitor 83. As the output of the amplifier 75 goes up, indicating decreased light passing from lamp 29 to photoelectric cell 31, usually because of broken filaments generating shadowing frizzes, curls or knots, thereby lessening light transmission, capacitor 81 is charged through resistors 85 and 87 toward the voltage value at the output of the amplifier for the time duration of this up output. When the output of amplifier 75 falls, due to a return to normal light transmission, capacitor 81 transfers its charge to the relatively large capacitor 83, through blocking diode 89 and small resistor 91. The steady state voltage of the terminal point 93 is maintained at some reference level by means of the voltage applied at the conductor 95 so that the voltage level at the movable tap 97 of potentiometer 99 is referenced to that value established by the tap setting. However, the charge transferred to the capacitor 83 increases the voltage at the terminal 93 above the reference level and correspondingly raises the voltage value at the movable tap 97. At a pre-determined voltage level at tap 97 the output produced by amplifier 101, which is connected directly to conductor 103, provides an input to amplifier 105 so that the output thereof at conductor 107 establishes a voltage level at conductor 109, connected to the voltage divider chain resistors 111 and 113, which causes collector current suddenly to flow in the transistor switching device 115. The purpose of the diode 117 is to provide a sharper switching threshold and the collector current is used to drive a suitable counter or similar device which registers or otherwise indicates or responds to the existence of a defect condition in threadline 39. Numeral 119 identifies such a counter.

It will be noted that the charge transfer relationship between the two capacitors 81 and 83 allows the circuit to respond to three different types of defect conditions of the filaments of threadline 39. First, it will be apparent that a number of closely spaced, relatively small enlarged portions on the filament 39 will cause a sufficiently rapid sequential charging of capacitor 83 from capacitor 81 to produce a voltage level at terminal 93 which will operate switch 115. Secondly, a single enlarged portion of threadline 39 having a narrow width, but sufficient to cause capacitor 81 to charge to a sufficient voltage which, when discharged, will charge capacitor 83 to the voltage threshold at terminal 93 to operate switch 115, will actuate the counter or other indicating device. Third, a sufficiently long and large or small portion on yarn 39 will allow capacitor 81 to charge for a sufficient time so as to permit it, when it is discharged, to transfer a charge to capacitor 83 which is great enough to operate switch 115.

The movable tap 97 establishes the threshold value at the terminal 93 at which switch 115 will be operated. By making a suitable adjustment of the potentiometer 99 this threshold value may be changed, as desired, to increase the sensitivity of the detector device or to make it suitable for use with a variety of threadlines of different deniers. It will be appreciated that since the threadline 39 travels at high speed, there will be an almost continuous slight variation in its diameter and shadow effect. Therefore, the photocell output will be varying rapidly and continuously. Thus, the voltage at terminal 93 is almost continuously somewhat above its reference voltage value even though a continuous leakage or discharge path is provided for capacitor 83. Yet, with the present capacitive circuit elements allowing for charge buildup and also permitting charge decay, even with the small variations in thickness of the threadline and the charges built up on capacitors 81 and 83 as a result thereof, the leakage of charge from the system prevents the detector from being unintentionally activated by closure of switch 115. Thus, the buildup and decay characteristics of the circuit are so balanced as to prevent switch actuation unless a defect of the type desired to be detected passes through the "window" between the lamp and the photoelectric cell and casts a sufficiently large shadow or a series of shadows to operate the detecting device.

Figure 5:
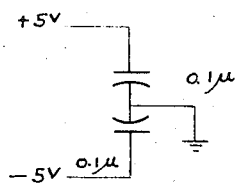
FIG. 5 is a diagram of a decoupling network for eliminating interference in the operation of the detector.
Figure 6:
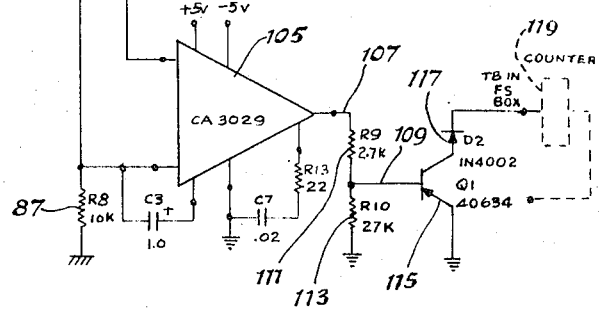
FIG. 6 is a plan view of three threadlines containing defects detectable by the present invention and by prior art threadline defect detectors.
Figure 6:
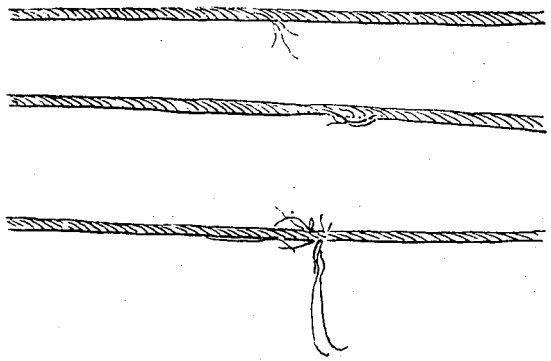
Figure 7:
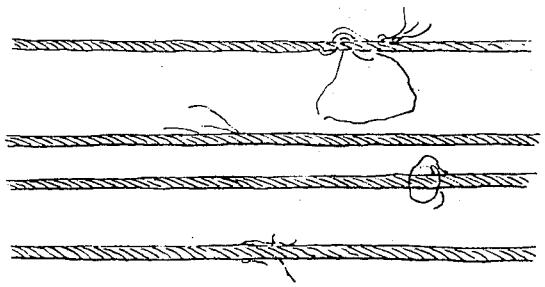
FIG. 7 is a plan view of four threadlines containing defects detectable by the present apparatus but not detectable by prior art threadline defect detectors.

To overcome any interferences with the signals and operations of the detector a decoupling network, such as that of FIG. 5, is provided across the ± 5V terminals of the amplifiers. Also, such interference is avoided by earth grounding certain parts (7) of the apparatus, as indicated, and shortening all lead wires.

In operation, it is a simple matter to set the threadline defect detecting device in position so that a quickly moving threadline will go through the passageway without touching either of the end walls of the hollow cylinders enclosing the radiation source and the receiver but will bear on the ceramic rods at either side of the tubes. The tops of such rods will normally be either at the mid-height of the tubes or at a distance, generally no greater than 200 mils, below such mid-height. The threadline will normally make an angle of 120° to 175°, preferably from 160° to 175°. After adjustment of the detector position and tightening of the adjustment means to hold the device firmly in place, potentiometer 99 may be adjusted to set the sensitivity and other properties of the amplifying circuit so as to signal the presence of defects which it is desired to note. Such adjustment may be on a trial and error basis, with known defects being passed through the detector and observation being continued to make certain that all defects are noted and no false readings are obtained. After setting up, the spinning, drawing, winding or other machine is set in motion and defects are counted, marked on the threadline, signaled audially or visually or are cut from the threadline, depending on the method of indication or monitoring desired.

A plurality of detectors may be used on a single line or a number of them may be used, with one or more for each threadline being processed. If a plurality of detectors is utilized on a single line they may be rotated so that the guide means or bearing surfaces are at different angles, whereby faults at different positions of the threadline will be better detected. If they are kept in the same plane, the detectors may be used for crosschecking purposes to insure their accuracy.

If, during use, parts need replacement, repair work is relatively simple with the present devices. Thus, to repair or replace the light bulb or photocell is an easy matter, requiring only the removal of the plastic silicone rubber cement and re-positioning and re-cementing. Similarly, if new tubes or rods are to be installed, the light and photocell may be removed and then the cement holding the tubes and rods in position is dissolved or broken off and new elements are installed. Even circuit element replacements may be relatively easily made, due to the ready removability of the cover plate and easy access to the parts inside the housing.

The present device is of greatest utility when it is employed on fast moving threadlines, such as polyester tire cord lines, on which polyester yarns, cords and threads are being spun, drawn or wound. Such lines move at a speed from 1,000 to 15,000 feet per minute, often from 4,000 to 8,000 feet per minute. The threadlines can vary in filament count over a wide range, depending on the particular yarn being produced. For instance, yarns of a total denier of 15 to 5,000 or more are conventionally produced. Such yarns correspond to a filament count of about 3 to 100 or more wherein the denier per filament is within the range of 0.5 to 15. For industrial yarns, such as tire cord, the denier per filament is preferably in the higher end of this range, such as about 7 to 15. For filament textile yarns the denier per filament is preferably in the lower end of this range, such as about 0.5 to 7.

During the spinning, drawing or winding operations, sometimes individual filaments are strained and are broken and it is such breaking which it is a main object of the present device to detect. Characteristic of synthetic continuous filaments, when broken due to tension being exerted thereon, is a tendency to recoil, curl or be snubbed backwards along the threadline to form a knotted or frizzy area in the yarn which appears in the threadline as an area of greater total denier or thickness. These signs of breaks are evident to the present detector and such defects may be noted or signaled by the detector, although other larger and more complex photoelectric cell devices previously utilized have been unable to discern and indicate some such defects.

The present detector is able to indicate defects which occur over relatively great lengths of threadline. The most prevalent lengths for defects to be distributed over and be detectable by the present devices are those from 2 to 50 times the normal diameter of the threadline. Usually, the defect will be over a length of 0.5 mm. to 3 mm. The broken filaments, which create the shadows on the photoelectric cell receptor surface are usually of a thickness of 1 to 30 percent of that of the threadline, often from 5 to 20 percent thereof. For good detection and fast response, a high response photoelectric cell is employed, such as a silicon cell which has a response time of about 20 microseconds. Cells with response times less than 1 millisecond, generally less than 0.5 millisecond and preferably less than 0.1 millisecond are preferred so that even at high speeds of the threadline the defects present, even over very short lengths, will be responded to by the photoelectric cell and the capacitors will be charged accordingly. Generally those photocells having response times of less than 0.5 millisecond will be able to respond very effectively to defects as short as one inch and even shorter, moving at a speed of about 5,000 feet per minute.

The advantages of the invention have been mentioned in part previously. It is economical to manufacture, compact, made from readily available materials, easy to install and adjust and relatively trouble free. Yet, it can detect threadline defects not discernible to more expensive and sophisticated equipment. The parts are of simple materials which possess sufficient strengths and electrical properties to make the device very useful. For example, the housing, generally a die-cast zinc housing, is sufficiently conductive so as to help to block stray signals from entering the electronic circuit. Other metals, e.g., copper, steel, aluminum, may also be used. The tubes and rods of the external portion of the device, plus the cements employed, are nonconductive and prevent shorting out of the lamp and photocell to the ground housing. The lamp and photocell are small, the former usually being of a diameter less than 1 cm., preferably less than 0.5 cm. and the latter having a receptor area less than 1 square centimeter, preferably less than 0.3 sq. cm. The photocell should be located at least two tube internal diameters and preferably 5 to 10, from the tube opening nearer to the threadline, to avoid stray light rays affecting it. For the same reason, the tube inside should be dark and non-reflective. The various parts are readily replaceable and accessible. The system may be adjusted by a potentiometer so as to be of desired sensitivity. The system is a low voltage one, with voltages being less than about 25 volts and many portions of the circuit having voltages of 10 volts or 5 volts. As shown, the external portion of the circuit is not shielded but if desired, in areas of intense external radiation, it may be desirable to shield these also, generally with a metal housing, foil or sheet cover. Instead of ceramic cylinders and rods, other materials, such as fired clays, porcelains, vitreous materials, e.g., glass, and synthetic organic polymeric plastics such as nylon, polypropylene, fiberglass reinforced polyester or phenolic resin may be employed for such parts.

Other modifications of the detector will be apparent to one of skill in the art, since equivalents may be employed and substitutes may be used without departing from the spirit of the invention. In some cases, because of the obviousness of certain parts of the circuit, e.g., feedback features of the amplifiers, input and output electrical connections, receptacle wiring, and response mechanisms, such as markers, cutters, signals, etc., these have not been described herein. Also, it will be apparent that various improvements may be made in circuits of this invention, for example, with respect to additional noise rejection features and modifications to utilize photocells of the best response characteristics, which are not too fast nor so slow as to cause the missing of certain defects. It is considered that such equivalents and improvements are still within the present inventive concept and the scope of the claims.

I claim:

1. A detector for indicating the presence of defects in a moving threadline which comprises a housing, an incandescent lamp or light emitting diode having a diameter less than 1 centimeter for providing radiation, a planar photoelectric cell having an area less than 1 square centimeter for receiving radiation, said lamp and said photoelectric cell being secured within hollow ceramic cylinders with a passageway between them defined by the ends of said cylinders said passageway allowing for the passage of a moving threadline so that the threadline partially interrupts the radiation from the emitter to the receiver, ceramic rod guide means of diameters less than that of said cylinders for maintaining said moving threadline in substantially constant positional relationship with the path of emitted radiation, said cylinders being secured between said rods and said rods being secured to the exterior of said housing, an electronic signal amplification circuit enclosed by said housing the input voltage to which is less than 25 volts, said circuit including capacitive means for producing an amplified signal which is changed in response to partially broken and frizzed or knotted sections of threadlines in which the break of one or more thread filaments and resulting frizzing or knotting occur over a length which is from about two to fifty times the width of the threadline and in which the broken filaments are of a thickness of from 1 to 30 percent that of the threadline, and a receptacle on said housing to which an operating signal from said electronic signal amplification circuit is communicated and from which it is transmittible to a counting device.

2. The apparatus of claim 1 wherein said rods are solid rods which are cemented to said cylinders, the opposite ends of said cylinders being closed and said lamp and photoelectric cell are held in place by opaque silicone rubber cement, which is removable when it is desired to change said lamp or said photoelectric cell element, said electronic circuit is substantially of the printed circuit type and means are provided, on said housing, for adjustably affixing said detector in place with respect to a moving threadline to be inspected or monitored.

* * * * *